W. COACKLEY.
FITTINGS FOR USE IN GLAZING ROOF AND LIKE STRUCTURES.
APPLICATION FILED OCT. 30, 1918.

1,315,285. Patented Sept. 9, 1919.

Inventor
W. Coackley.
By H. R. Kerslake
Atty.

UNITED STATES PATENT OFFICE.

WILLIAM COACKLEY, OF PENDLETON, MANCHESTER, ENGLAND.

FITTINGS FOR USE IN GLAZING ROOF AND LIKE STRUCTURES.

1,315,285. Specification of Letters Patent. Patented Sept. 9, 1919.

Application filed October 30, 1918. Serial No. 260,393.

*To all whom it may concern:*

Be it known that I, WILLIAM COACKLEY, of 8 Broad street, Pendleton, Manchester, England, a subject of the King of Great Britain and Ireland, have invented certain new and useful Improvements in Fittings for Use in Glazing Roof and like Structures, of which the following is a specification.

This invention has for its object to provide new or improved fittings for economizing labor in glazing roof and like structures, the said fittings enabling the T astragals or glazing supports to be secured in position in the condition in which they are delivered from the rolling mills and without the necessity for any drilling, counter-sinking or forging of the same.

My invention comprises the improved combinations and arrangements of parts hereinafter described.

Referring to the accompanying explanatory drawings:—

Fig. 7 is a detail view to be hereinafter referred to.

Figure 1:
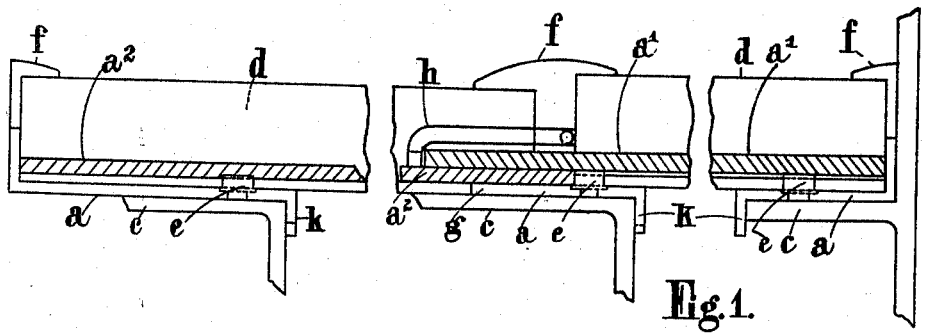
Figure 1 is an elevation showing upper, lower and intermediate types of my improved fittings supporting T astragals and arranged in accordance with my invention.

In accordance with my present invention, each of my improved fittings whether employed at the ends of a roof or like structure or in intermediate positions where one length of glazing overlaps another, comprises an arm or like part $a$ which may have a countersunk slot $b$ therein, to receive the head of a bolt or screw by which the fitting is secured upon an angle iron as $c$, or purlin, scantling or other part of the roof or like structure. The said arm is adapted to support the end of a T shaped astragal or bar $d$ and has lug-like projections $e$ at opposite sides to prevent lateral displacement of the T bar which rests thereon. There is also upon the said arm an upwardly projecting turned over or hook-like part $f$ under which the end of the T astragal passes so that the latter cannot be lifted from the fitting but must be slid longitudinally therefrom. The upper fitting is that shown to the right of Fig. 1 and lettered $d$.

Figure 2:
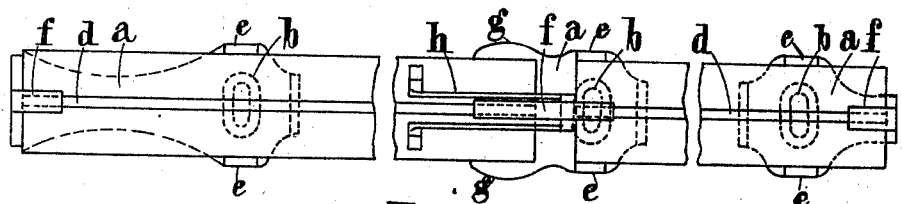
Fig. 2 is a plan view of the parts shown in Fig. 1.
Figure 3:
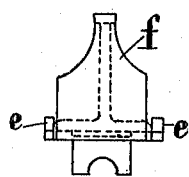
Fig. 3 is an end elevation of the lower fitting looking from left to right of Fig. 1.
Figure 4:
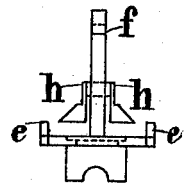
Fig. 4 is an end view of the intermediate fitting looking from left to right of Fig. 1.
Figure 5:
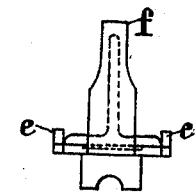
Fig. 5 is an end view of the upper fitting looking from right to left of Fig. 1.
Figure 6:
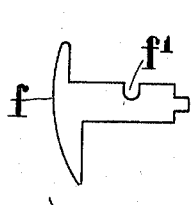
Fig. 6 is a plan view of the intermediate fitting with the upright member thereof detached and laid on its side.
Figure 6:
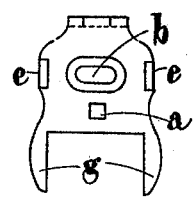

The intermediate type of fitting has, in addition to the features before described, a forked or slotted projecting part $g$ (see Fig. 6), which serves to embrace that T astragal which is adjacent the one supported upon the arm portion $a$ of the fitting. Such second T (lettered $d$ at the left hand of Fig. 1) is supported by or rests directly upon the angle iron $c$ or the like (see Fig. 1) to which the fitting is secured. To prevent the upper length $a'$ of the over-lapping glazing ($a^2$ indicates the lower length) from slipping or downward displacement, I provide a slot $f'$ (Fig. 6) in the upwardly projecting part $f$ which receives the center or pivot portion of a U-shaped element $h$ (Figs. 1 and 2) having downwardly projecting ends upon the extremities of the U which engage the lower ends of the glazing $a'$ and hold it in place (see Fig. 1). When the upper T astragal is in position, the center or pivot portion of the U is held in its slot $f'$ by the end of the T which abuts against the part $f$.

Figure 7:
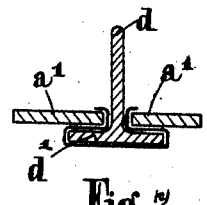

The glazing may be held down upon the astragals by metal plate clips $d'$ embracing the base of the latter and turned over the edges of the glass as shown in Fig. 7.

Each of my improved fittings has a turned down portion $k$ for engaging the angle iron or the like $c$ upon which it is supported and in the case of the intermediate and lower fittings, for taking the weight which tends to displace the glazing downward, off the studs or bolts holding the fittings upon their supports.

I may vary the details of my fitting to suit requirements.

Having now described my invention what I claim as new and desire to secure by Letters Patent is:—

1. In roof and like glazing, the combination with an astragal or supporting member for the glass, of means for securing the said member in its service position, consisting in part of an arm in attachment with the structure to be glazed and having projections engaging the sides and top of the astragal, as set forth.

2. In roof and like glazing, the combination with a pair of astragals or supporting members for the glass, of an attachment arm having lateral projections therefrom engaging the sides of one of the said astragals, a forked end projection embracing the sides of the other astragal, and an upturned projection engaging the top of both astragals, as set forth.

3. In roof and like glazing, the combination consisting of a pair of astragals or supporting members for the glass, an attachment arm having lateral projections therefrom engaging the sides of one of the said astragals, a forked end projection embracing the sides of the other astragal, and an upturned projection engaging the top of both astragals, with a glazing retaining piece connected to the said upturned projection, as set forth.

4. In roof and like glazing, the combination consisting of a pair of astragals or supporting members for the glass, an attachment arm having lateral projections therefrom engaging the sides of one of the said astragals, a forked end projection embracing the sides of the other astragal and an upturned projection engaging the top of both astragals, with a glazing retaining piece connected to the said upturned projection, and holding down pieces for the glazing embracing the astragal bases, as set forth.

In testimony whereof I have signed my name to this specification.

WILLIAM COACKLEY.

Copies of this patent may be obtained for five cents each, by addressing the "Commissioner of Patents, Washington, D. C."